April 8, 1930.  R. P. LANSING  1,753,830
ENGINE STARTER
Filed Oct. 9, 1926  2 Sheets-Sheet 1
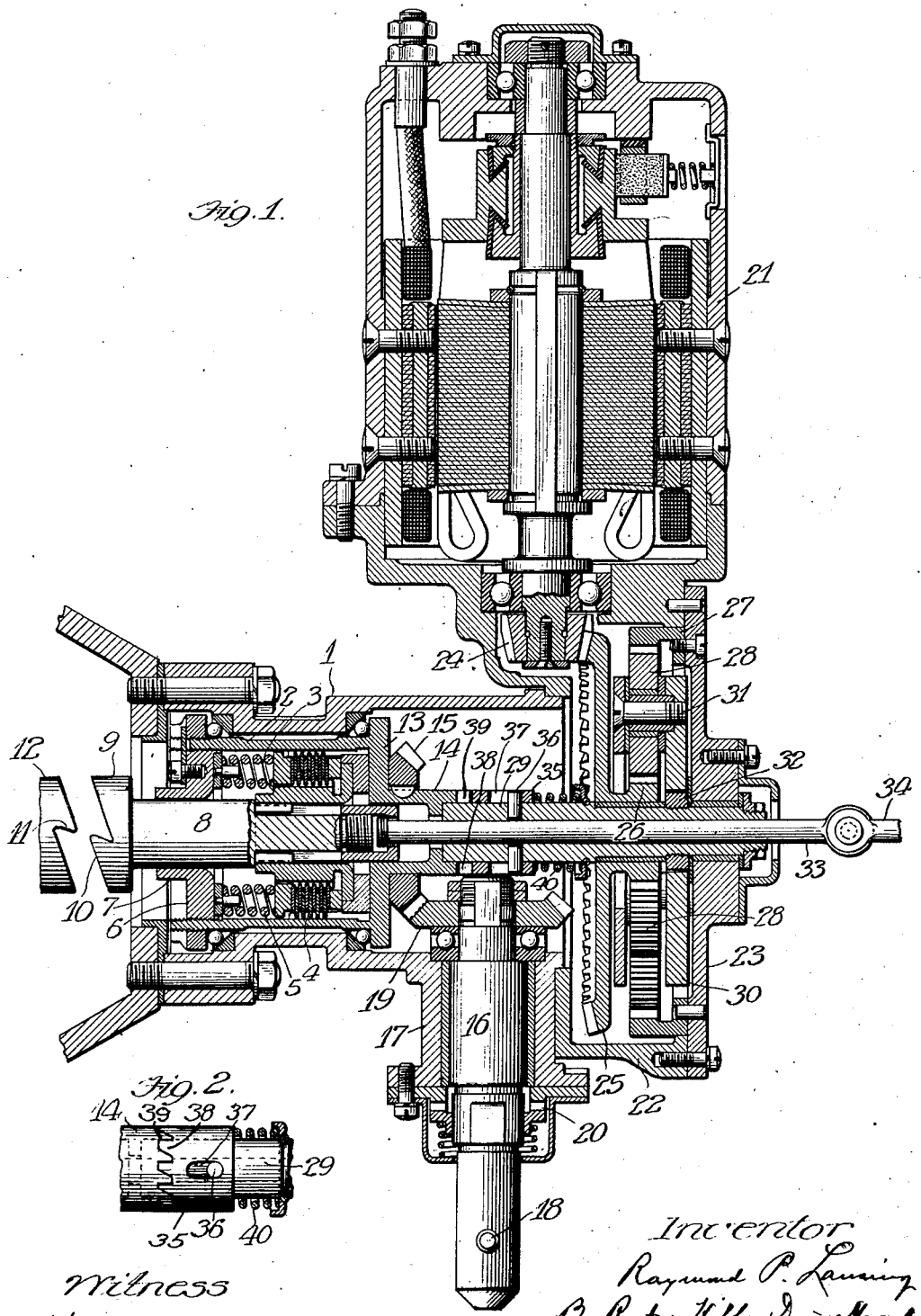

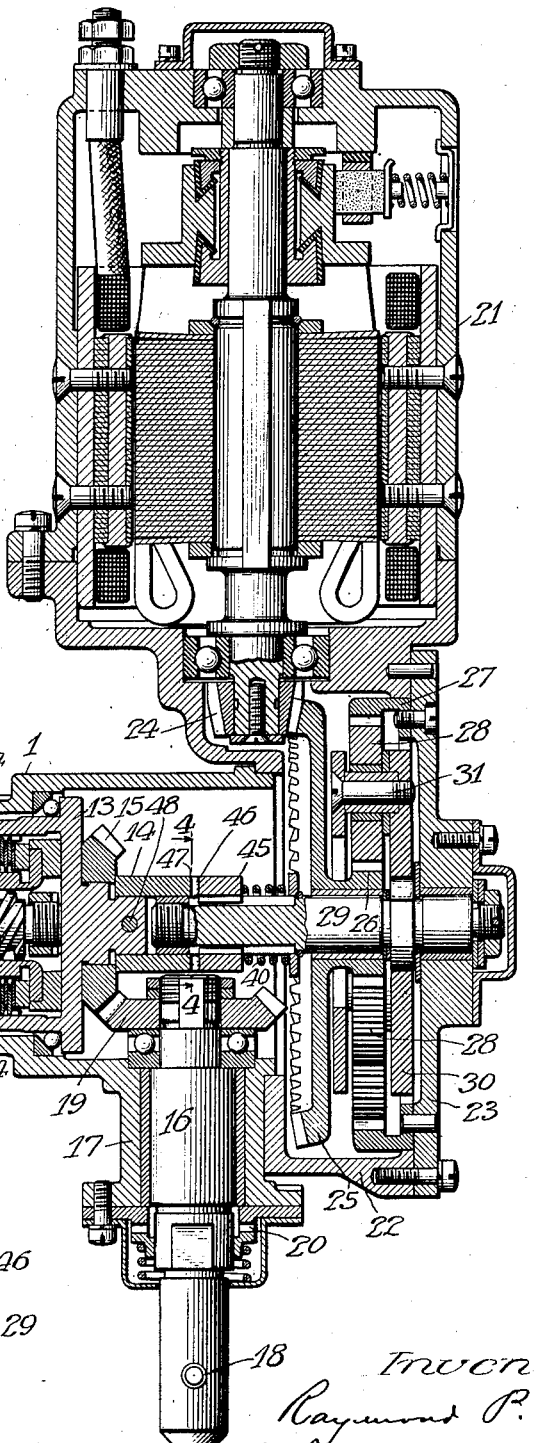

Patented Apr. 8, 1930

1,753,830

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

ENGINE STARTER

Application filed October 9, 1926. Serial No. 140,458.

My invention relates to engine starting apparatus for the starting of internal combustion engines, more particularly but not necessarily airplane engines, and the object thereof is to provide a simple, efficient and reliable apparatus of this character for either power or manual operation or both combined and characterized more particularly by novel and efficient construction whereby the power means and its operating connections may be automatically disengaged from the apparatus in automatic manner and as an incident to the operation of the manual means.

In the drawings Fig. 1 is a sectional elevation of my apparatus; Fig. 2 a detailed view of the disengaging clutch; Fig. 3 a sectional elevation of a modified form of apparatus and Fig. 4 a detail of the disengaging clutch used therein.

Referring to the apparatus as illustrated in Figs. 1 and 3 the same comprises essentially the drive or transmission proper including a driving member normally disengaged from but adapted to engage the engine member, manually operated means connected with the drive preferably in substantially direct connection, power means such as an electric motor and its operating connections such as reduction gearing connecting between such motor and the drive, such operating connections also including the one-way clutch the provision and arrangement of which forms the main feature of this invention.

First describing the drive or transmission as shown in Fig. 1, the same is located and mounted within a main casing 1 within which rotates a barrel 2 and a shell 3 concentrically arranged therewithin and providing an annular space to receive a yieldable driving connection which is here in the form of a friction clutch 4. The sets of plates of this clutch are splined respectively to the interior of the barrel and the exterior of the shell and the proper spring pressure is provided for such friction plates by means of a series of springs 5 located in such annular space. The necessary spring tension is obtained by adjusting the nut 6 which is provided with a sleeve portion 7 and which cooperates with internal screw threads in the barrel 2.

Within the shell 3 and sleeve 7 there is mounted for longitudinal and rotary movement the driving member which is here in the form of a driving shaft 8 splined at its right hand end, Fig. 1, to the shell 3 and carrying at its outer end a clutch member 9 having inclined clutch jaws 10 adapted to engage complementary inclined clutch jaws 11 of a clutch member 12 which is a part of or connected to any suitable rotatable part of the engine to be cranked and started.

The driving barrel 2 has an end plate 13 and a projecting hub 14 into which the right hand end of the driving member or shaft 8 extends and which is therefore in axial alinement therewith. To the inner end of this hub 14 there is drivingly secured a bevel pinion 15 with which the manual means cooperates.

Describing the manual means the same comprises a cranking shaft 16 having its bearings in an extension 17 of the main casing and projecting therefrom and thereat provided with suitable cranking means such as pins 18 with which an ordinary hand crank is caused to engage. The cranking shaft is provided at its inner end within the casing with a bevel pinion 19 meshing with the pinion 15 and adapted to drive the latter. The cranking shaft 16 is preferably provided with a locking ratchet device 20 adapted to prevent rotation of such shaft in a backward direction such as occasioned by backfire.

The power means consists of an electric motor 21 secured in suitable manner to the casing 1 and to a supplemental casing 22 and its cover plate 23, and the extended armature shaft thereof provided with a bevel pinion 24 operatively connected by suitable operating connections including reduction gearing with the hub 14 of the drive. The reduction gearing which is contained within the casing 22 comprises a large bevel gear 25 with which the bevel pinion 24 meshes and the same is provided on its hub with a sun gear 26 with which and with a stationary internal gear 27 a series of three planetary pinions 28 mesh. The gear 25 is mounted to rotate loosely on a central shaft 29 which I will term the main driven shaft and the plate 30 of the planetary gear cage on which the pinions 28 are journaled by means of studs 31 is drivingly secured thereto by interlocking with a collar 32 secured to such shaft 29. The inner end of the shaft 29 is in axial alinement with and has its bearing within the hub 14 of the drive. The shaft 29 has a central bore through which loosely passes a manually operated rod 33 extending also centrally through the hub 14 and at its left hand end engaging the driving member 8. This rod 33 is operated by any suitable operating connections a part of one of which is indicated at 34, the same extending to a point in convenient reach of the operator.

The driving connection between the shaft 29 and the hub 14 is in the present instance a one-way clutch device of the ratchet type and consisting of a sleeve 35 mounted to slide upon the shaft 29 and driven by such shaft through the two cross pins 36 cooperating with the longitudinal slots 37 in the sleeve. Cooperating ratchet teeth 38 and 39 are cut respectively on the end of the sleeve 35 and the adjacent end of the hub 14. These ratchet teeth are normally held in driving engagement by the coil spring 40 and such teeth are such that they permit the transmission of torque from the shaft 29 to the hub 14 when the motor 21 is the driver, but do not transmit torque when the hub 14 becomes the driver as when the cranking shaft 16 is the driving means.

Thus when the motor is the driver the torque will be transmitted through the reduction gearing to the shaft 29 and thence through the ratchet clutch to the hub 14 and finally to the driving member 8 through the driving barrel 2, friction clutch 4, and sleeve 3. At the proper time as determined by the operator, either before the motor 21 has been energized or afterwards, the rod 33 is manually thrust to the left to shift the driving member 8 into clutch engagement with the engine member 12, whereupon the engine will be cranked. When the engine starts on its own power the clutch members 9 and 12 will automatically disengage owing to the inclined formation of the clutch jaws or, if desired, the rod 33 may be spring pressed so as to be withdrawn thereby when the inward pressure to the left, Fig. 1, is removed.

Now assuming that the cranking shaft 16 is utilized as the starting means, the rotation of such shaft rotates the hub 14 of the drive through the bevel gears 19 and 15, and as an incident to such rotation the ratchet clutch on the shaft 29 will operate to eliminate the motor and its reduction gearing as well as such shaft 29 from operation or rotation so that all of the torque of the manual means will be utilized and transmitted through the drive to the engine and not be wasted in rotating the other parts which are concerned only with the power means.

Referring to the modification illustrated in Figs. 3 and 4 the same parts are given corresponding reference numerals. According to this construction the manual shifting of the driving member 8 by means of the rod 33 is dispensed with and an automatically operating driving member is employed. In addition the clutch mechanism between the shaft 29 and the hub 14 of the drive is made somewhat different.

Referring to the driving member of Fig. 3 the same comprises a shaft having a central smooth portion 40 and a screw threaded portion 41 at its right hand end and a splined or engine engaging portion 42 at its other end adapted to drivingly engage the engine member 43 which is hollow and provided with corresponding straight splines. Also the sleeve 44 is threaded upon the threaded portion 41 of the driving member.

Referring to the clutch between the shaft 29 and the hub 14 a clutch member 45 is splined to the shaft 29 and provided with ratchet teeth 46 adapted to cooperate with ratchet teeth 47 cut on the right hand end of the hub 14. In this construction the hub 14 of the drive is made as a separate piece or sleeve which is secured to the plate 13 in suitable manner as by means of the pin 48. In this instance, also, the shaft 29 is received within and has its bearing on the hub or sleeve 14.

This modified construction operates the same as that of Fig. 1 except that the driving member is automatically operated in its engagement and disengagement. When the drive is rotated the screw threaded action between the driving member and the sleeve or nut 44 causes such driving member to advance or move outwardly into driving engagement with the engine member, it being understood that the driving member is held from rotation during such advance movement by the plate 49.

I claim:

1. An engine starter including a drive having a driving member adapted to engage and crank a member of the engine to be started, manually operated starter means operatively connected with said drive, power means for imparting cranking movement to said drive and operating connections between such power means and the drive including means for disconnecting the power means responsive to cranking operation of the manual means for preventing said drive from driving the power means.

2. An engine starter including a drive having a driving member adapted to engage and crank a member of the engine to be started, manually operated starter means operatively connected with said drive, power means for imparting cranking movement to said drive, and operating connections between such power means and the drive including means controlled in the engine cranking movement of the drive by the cranking movement of said manually operated means for rendering ineffective the driving connection between said power means and operating connections and said drive; said last-included means comprising a one-way clutch.

3. An engine starter including a drive having a driving member adapted to engage and crank a member of the engine to be started, manually operated starter means operatively connected with said drive, power means, and operating connections between such power means and the drive including means for rendering ineffective the driving connection between the power means and the drive when the manually operated means are crankingly operated, said operating connections also including a main driven shaft and said operating-connections-included means comprising a one-way clutch mounted on such shaft and forming the driving connection between the shaft and the drive.

4. An engine starter including a drive having a driving member adapted to engage and crank a member of the engine to be started, manually operated starter means operatively connected with said drive, power means, and operating connections between such power means and the drive including means for rendering ineffective the driving association between the power means and such operating connections and the drive when the manually operated means are crankingly operated, said drive having a projecting hub, and said operating connections also including a main driven shaft in axial alinement with and received by said hub, and said operating-connections-included means comprising a clutch connecting between said shaft and hub.

5. An engine starter including a drive having a driving member adapted to engage and crank a member of the engine to be started, manually operated starter means operatively connected with said drive, power means and operating connections between such power means and the drive including means for rendering ineffective the driving association between the power means and such operating connections and the drive when the manually operated means are operated, said drive having a projecting hub, and said operating connections also including a main driven shaft in axial alinement with and received by said hub, and said operating-connections-included means comprising a one-way clutch consisting of a movable ratchet member on said shaft and a fixed ratchet member on said hub.

6. An engine starter including a drive having a driving member adapted to engage and crank a member of the engine to be started, manually operated starter means operatively connected with said drive, power means, and operating connections between such power means and the drive including means for rendering ineffective the driving association between the power means and such operating connections and the drive when the manually operated means are operated, said operating connections also including reduction gearing and a main driven shaft therefor, and said operating-connections-included means comprising a clutch mounted on such shaft and forming the driving connection between the shaft and the drive.

7. An engine starter including a drive having a driving member adapted to engage and crank a member of the engine to be started, manually operated starter means operatively connected with said drive, power means, and operating connections between such power means and the drive including means for rendering ineffective the driving association between the power means and such operating connections and the drive when the manually operated means are operated, said drive having a projecting hub, a gear on said hub driven by said manual means, and said operating connections also including a main driven shaft bearing in said hub, and said operating-connections-included means being mounted on said shaft and connecting between it and the hub.

8. An engine starter having a rotatable driving member adapted to engage a member of the engine to be started for cranking it, manually operated starter means operatively associated with said driving member for rotating it, power means for rotating said driving member, operating connections between said power means and said driving member, and means controlled in operation by the cranking movement of said driving member for automatically breaking the rotating connection between said power means and said operating connections and said driving member when said manually operated means are operated to crank the engine.

In testimony whereof, I have subscribed my name.

RAYMOND P. LANSING.